United States Patent
Krishnan et al.

(10) Patent No.: US 11,318,914 B2
(45) Date of Patent: May 3, 2022

(54) MANIFOLD FOR VEHICLE SENSOR CLEANING

(71) Applicant: Ford Global Technologies, LLC, Dearborn, MI (US)

(72) Inventors: Venkatesh Krishnan, Canton, MI (US); Segundo Baldovino, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 203 days.

(21) Appl. No.: 16/804,539

(22) Filed: Feb. 28, 2020

(65) Prior Publication Data
US 2021/0268995 A1 Sep. 2, 2021

(51) Int. Cl.
*B60S 1/56* (2006.01)
*B60S 1/48* (2006.01)
*G05D 1/00* (2006.01)
*B60S 1/52* (2006.01)
*B60S 1/50* (2006.01)

(52) U.S. Cl.
CPC . *B60S 1/56* (2013.01); *B60S 1/48* (2013.01); *B60S 1/50* (2013.01); *B60S 1/52* (2013.01); *G05D 1/0088* (2013.01)

(58) Field of Classification Search
CPC . F16K 27/003; F15B 13/0814; F15B 13/0817
See application file for complete search history.

(56) References Cited

U.S. PATENT DOCUMENTS

| | | | |
|---|---|---|---|
| 6,235,199 B1 * | 5/2001 | Peterson | A61M 1/1656 210/252 |
| 6,896,199 B2 | 5/2005 | Bissonnette | |
| 8,511,336 B1 | 8/2013 | Schumacher | |
| 2012/0241008 A1 * | 9/2012 | Mills | C23F 1/02 137/1 |
| 2014/0109990 A1 | 4/2014 | Brashear | |
| 2016/0152213 A1 * | 6/2016 | Baerg | B60S 1/54 134/56 R |

(Continued)

FOREIGN PATENT DOCUMENTS

EP 3168094 B1 3/2018
JP 59231201 A 12/1984

OTHER PUBLICATIONS

Xhang, Microfluidics and Micro Total Analytical Systems, 2014, Molecular Sensors and Nanodevices, https://www.sciencedirect.com/topics/engineering/hagen-poiseuille-equation (Year: 2014).*

*Primary Examiner* — Michael E Barr
*Assistant Examiner* — Omair Chaudhri
(74) *Attorney, Agent, or Firm* — Frank A. MacKenzie; Bejin Bieneman PLC

(57) ABSTRACT

A fluid apparatus includes a straight pipe; an inlet fluidly connected to the pipe; a first cylindrical tube, a second cylindrical tube, and a third cylindrical tube each fluidly connected to and elongated from the pipe; a first solenoid valve controlling flow through the first cylindrical tube; a second solenoid valve controlling flow through the second cylindrical tube; a third solenoid valve controlling flow through the third cylindrical tube; a first outlet fluidly connected only to the first solenoid valve; and a second outlet fluidly connected only to the second solenoid valve and the third solenoid valve.

18 Claims, 5 Drawing Sheets

(56) References Cited

U.S. PATENT DOCUMENTS

| | | | |
|---|---|---|---|
| 2019/0061698 A1* | 2/2019 | Mizuno | B08B 5/04 |
| 2019/0359178 A1* | 11/2019 | Hornby | F16K 11/24 |
| 2020/0180567 A1* | 6/2020 | Sakai | B60S 1/528 |
| 2020/0317160 A1* | 10/2020 | Albrecht | F16K 27/003 |
| 2021/0261097 A1* | 8/2021 | Grether | B60S 1/52 |

* cited by examiner

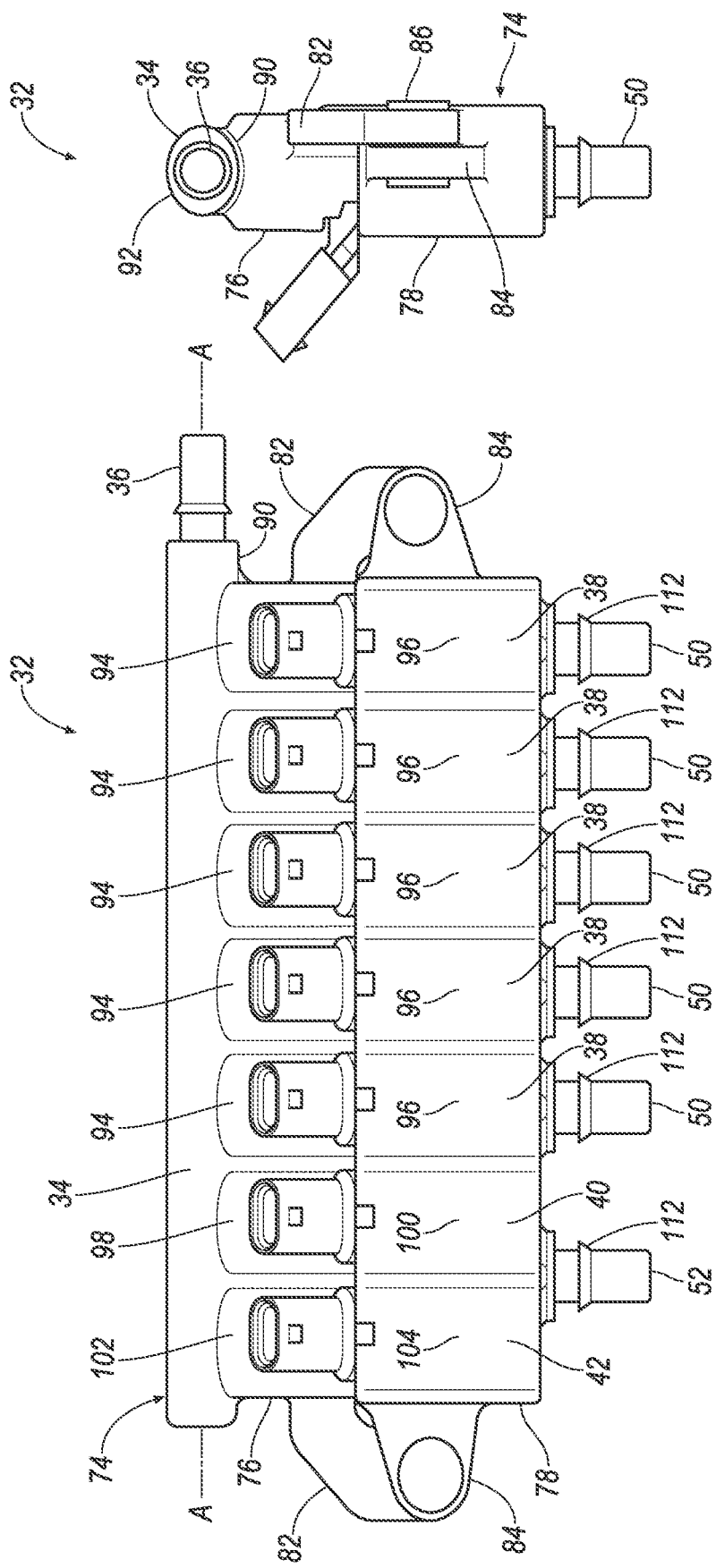

US 11,318,914 B2

MANIFOLD FOR VEHICLE SENSOR CLEANING

BACKGROUND

Vehicles, such as autonomous or semi-autonomous vehicles, typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices. Sensor operation can be affected by obstructions, e.g., dust, snow, insects, etc.

BRIEF DESCRIPTION OF THE DRAWINGS

FIG. 3 is a front view of a manifold of the cleaning system.

FIG. 4 is a side view of the manifold.

DETAILED DESCRIPTION

Figure 1:
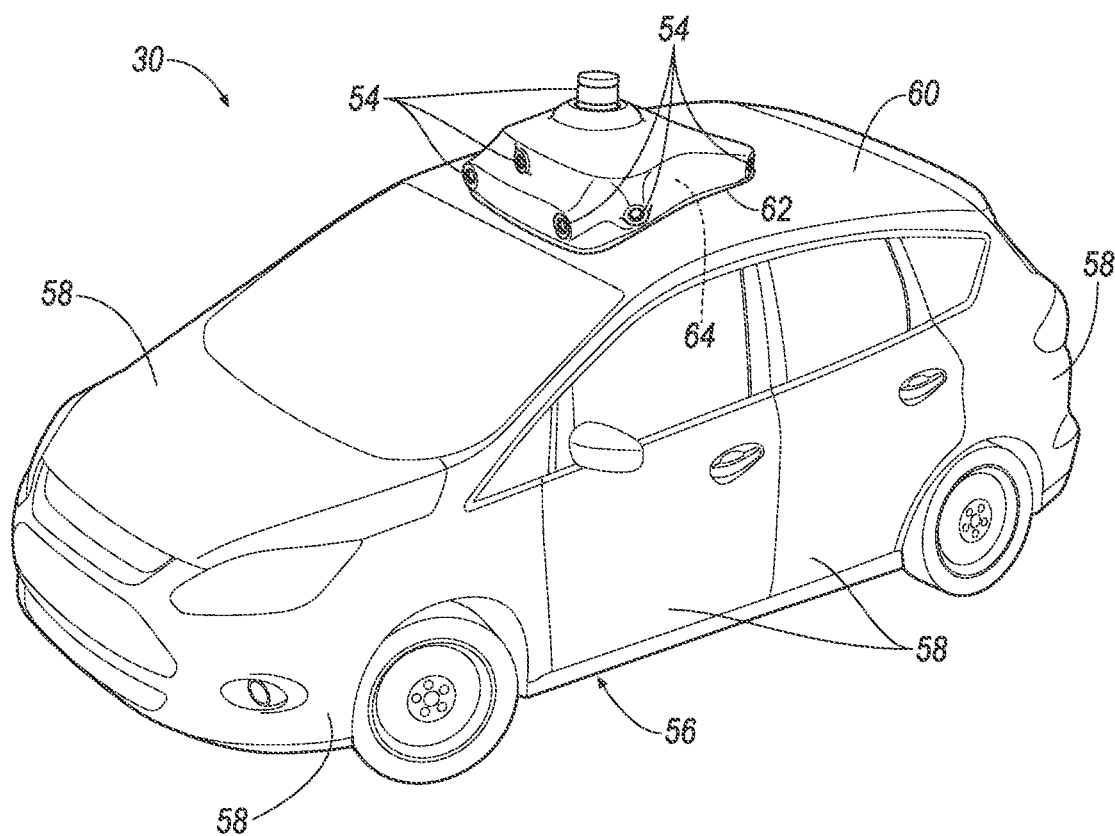
FIG. 1 is a perspective view of an example vehicle including a sensor assembly.

A fluid apparatus includes a straight pipe; an inlet fluidly connected to the pipe; a first cylindrical tube, a second cylindrical tube, and a third cylindrical tube each fluidly connected to and elongated from the pipe; a first solenoid valve controlling flow through the first cylindrical tube; a second solenoid valve controlling flow through the second cylindrical tube; a third solenoid valve controlling flow through the third cylindrical tube; a first outlet fluidly connected only to the first solenoid valve; and a second outlet fluidly connected only to the second solenoid valve and the third solenoid valve.

The first and second outlets may each include a flange extending radially outward and angled toward the pipe.

The fluid apparatus may further include a controller communicatively coupled to the first solenoid valve, the second solenoid valve, and the third solenoid valve, and the controller may be programmed to instruct the second solenoid valve and the third solenoid valve to actuate only together. The controller may be programmed to instruct the first solenoid valve to actuate independently of the second solenoid valve and third solenoid valve.

The pipe may have a circular cross-section defining an internal diameter. The internal diameter of the pipe may continuously increase from the one of the first cylindrical tube, second cylindrical tube, and third cylindrical tube that is closest to the inlet to the one of the first cylindrical tube, second cylindrical tube, and third cylindrical tube that is farthest from the inlet.

The fluid apparatus may further include a manifold including a first manifold section, and the first manifold section may include the straight pipe, the inlet, the first cylindrical tube, the second cylindrical tube, and the third cylindrical tube. The first manifold section may be a single piece.

The manifold may include a second manifold section, and the second manifold section includes the first outlet and the second outlet. The second manifold section may be a single piece.

The first cylindrical tube may include a first first-manifold-section portion that is part of the first manifold section and a first second-manifold-section portion that is part of the second manifold section; the second cylindrical tube may include a second first-manifold-section portion that is part of the first manifold section and a second second-manifold-section portion that is part of the second manifold section; the third cylindrical tube may include a third first-manifold-section portion that is part of the first manifold section and a third second-manifold-section portion that is part of the second manifold section; the first solenoid valve may be press-fit into the first first-manifold-section portion and into the first second-manifold-section portion; the second solenoid valve may be press-fit into the second first-manifold-section portion and into the second second-manifold-section portion; and the third solenoid valve may be press-fit into the third first-manifold-section portion and into the third second-manifold-section portion.

The first cylindrical tube, the second cylindrical tube, and the third cylindrical tube may be elongated perpendicular to the pipe.

The first cylindrical tube, the second cylindrical tube, and the third cylindrical tube may be arranged in series along the pipe.

The first cylindrical tube, the second cylindrical tube, and the third cylindrical tube may be elongated parallel to each other from the pipe.

Internal cross-sectional areas of the first cylindrical tube, the second cylindrical tube, and the third cylindrical tube may be substantially equal to each other.

Internal cross-sectional areas of the first outlet and the second outlet may be substantially equal to each other.

The fluid apparatus may further include a pump fluidly connected to the inlet.

With reference to the Figures, a fluid apparatus 32 for a vehicle 30 includes a straight pipe 34; an inlet 36 fluidly connected to the pipe 34; at least one first cylindrical tube 38, at least one second cylindrical tube 40, and at least one third cylindrical tube 42 each fluidly connected to and elongated from the pipe 34; at least one first solenoid valve 44 controlling flow through a respective one of the first cylindrical tubes 38; at least one second solenoid valve 46 controlling flow through a respective one of the second cylindrical tubes 40; at least one third solenoid valve 48 controlling flow through a respective one of the third cylindrical tubes 42; at least one first outlet 50 fluidly connected only to a respective one of the first solenoid valves 44; and at least one second outlet 52 fluidly connected only to a respective one of the second solenoid valves 46 and a respective one of the third solenoid valves 48.

The fluid apparatus 32 can provide fluid to two different targets that each require a different pressure. The target receiving fluid from the second outlet 52 receives fluid at a higher pressure than the target receiving fluid from the first outlet 50, while the fluid for both targets is still provided through the same fluid apparatus 32. The pressure at the second outlet 52 is additive of the pressures from the second solenoid valve 46 and the third solenoid valve 48, and the pressure at the first outlet 50 is only the pressure from the first solenoid valve 44. For example, the pressure supplied to each solenoid valve 44, 46, 48 can be 1.3 bar, so the pressure at the first outlet 50 is 1.3 bar and the pressure at the second outlet 52 is 2.6 bar. The fluid apparatus 32 provides a low pressure drop from the inlet 36 to the second outlet 52 because of the combining of the fluid flow from the second solenoid valve 46 and the third solenoid valve 48. Moreover, the fluid apparatus 32 provides for a compact packaging of components, providing greater design flexibility for other components of the vehicle 30. The fluid apparatus 32 packages components to divide the fluid provided by a single source into multiple fluid streams for multiple targets, and those components are combined into a relatively flat package that is more compact than, e.g., a branching structure of tubes with valves disposed close to the targets. Keeping the components of the fluid apparatus 32 contained in a single package frees up space elsewhere in, e.g., a housing 62 for sensors 54.

With reference to FIG. 1, the vehicle 30 can be any passenger or commercial automobile such as a car, a truck, a sport utility vehicle, a crossover, a van, a minivan, a taxi, a bus, etc.

The vehicle 30 may be an autonomous vehicle. A computer can be programmed to operate the vehicle 30 independently of the intervention of a human driver, completely or to a lesser degree. The computer may be programmed to operate the propulsion, brake system, steering, and/or other vehicle systems based at least in part on data received from the sensors 54. For the purposes of this disclosure, autonomous operation means the computer controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering.

The vehicle 30 includes a body 56. The vehicle 30 may be of a unibody construction, in which a frame and the body 56 of the vehicle 30 are a single component. The vehicle 30 may, alternatively, be of a body-on-frame construction, in which the frame supports the body 56 that is a separate component from the frame. The frame and body 56 may be formed of any suitable material, for example, steel, aluminum, etc.

The body 56 includes body panels 58 partially defining an exterior of the vehicle 30. The body panels 58 may present a class-A surface, e.g., a finished surface exposed to view by a customer and free of unaesthetic blemishes and defects. The body panels 58 include, e.g., a roof 60, etc.

The housing 62 for the sensors 54 is attachable to the vehicle 30, e.g., to one of the body panels 58 of the vehicle 30, e.g., the roof 60. For example, the housing 62 may be shaped to be attachable to the roof 60, e.g., may have a shape matching a contour of the roof 60. The housing 62 may be attached to the roof 60, which can provide the sensors 54 with an unobstructed field of view of an area around the vehicle 30. The housing 62 may be formed of, e.g., plastic or metal.

The housing 62 may enclose and define a cavity 64. One or more of the body panels 58, e.g., the roof 60, may partially define the cavity 64 along with the housing 62, or the housing 62 may fully enclose the cavity 64. The housing 62 may shield contents of the cavity 64 from external elements such as wind, rain, debris, etc.

The sensors 54 may detect the location and/or orientation of the vehicle 30. For example, the sensors 54 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 54 may detect the external world, e.g., objects and/or characteristics of surroundings of the vehicle 30, such as other vehicles, road lane markings, traffic lights and/or signs, pedestrians, etc. For example, the sensors 54 may include radar sensors, scanning laser range finders, light detection and ranging (LIDAR) devices, and image processing sensors such as cameras. The sensors 54 may include communications devices, for example, vehicle-to-infrastructure (V2I) or vehicle-to-vehicle (V2V) devices.

The sensors 54 are disposed in the cavity 64 of the housing 62 or are mounted to the housing 62. For example, the sensors 54 can include multiple cameras disposed in the cavity 64 and at least one LIDAR device mounted to the housing 62, as shown in FIG. 1.

Figure 2:
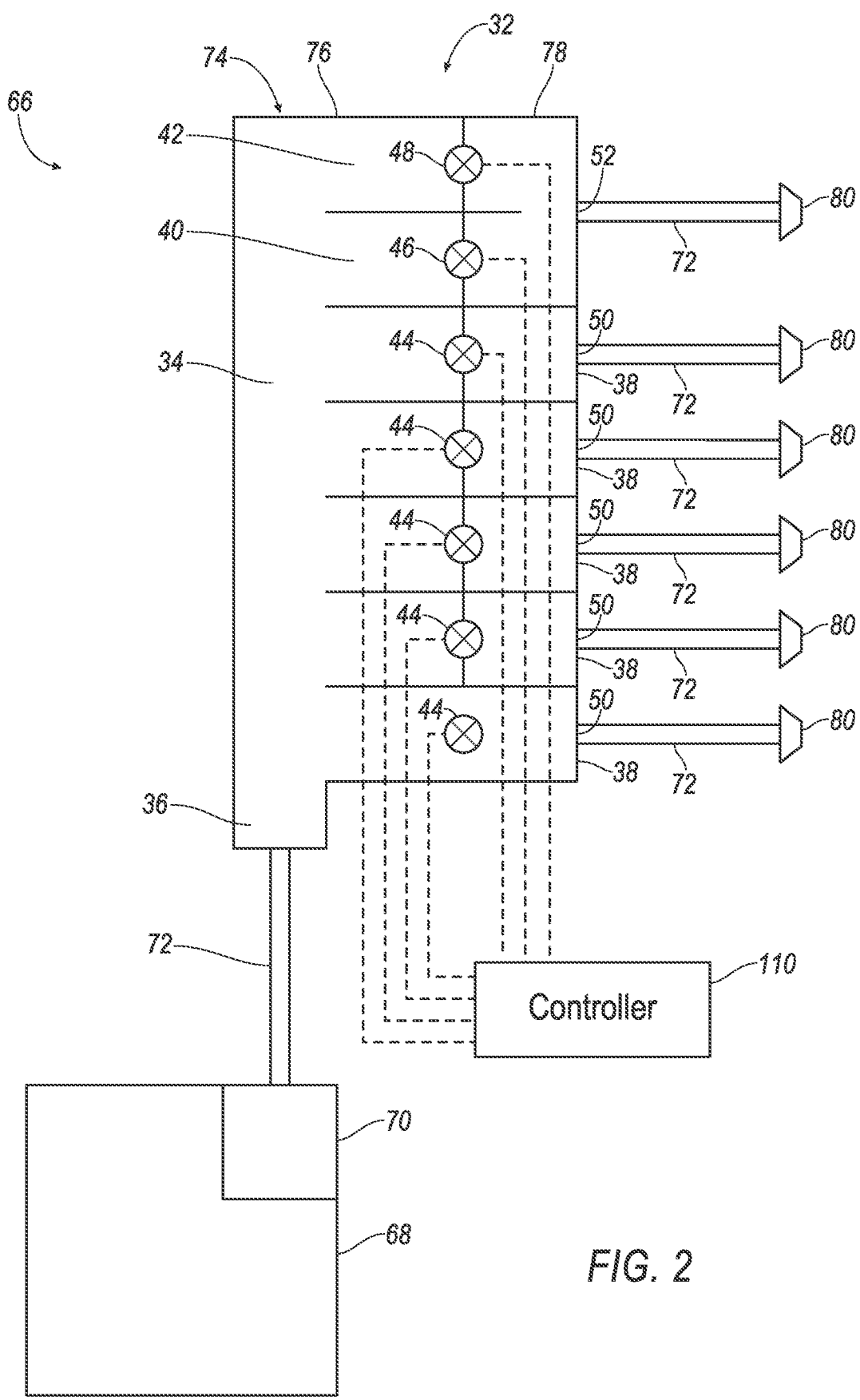
FIG. 2 is a diagram of a cleaning system for the sensor assembly.

With reference to FIG. 2, a cleaning system 66 of the vehicle 30 includes a reservoir 68, a pump 70, supply lines 72, a manifold 74 (which includes a first manifold section 76 and a second manifold section 78), and nozzles 80. The reservoir 68, the pump 70, and the nozzles 80 are fluidly connected to each other (i.e., fluid can flow from one to the other) via the supply lines 72 and the manifold 74. The cleaning system 66 distributes washer fluid stored in the reservoir 68 to the nozzles 80. "Washer fluid" is any liquid stored in the reservoir 68 for cleaning. The washer fluid may include solvents, detergents, diluents such as water, etc.

The reservoir 68 is a tank fillable with liquid, e.g., washer fluid for window cleaning. The reservoir 68 may be disposed in a front of the vehicle 30, specifically, in an engine compartment forward of a passenger cabin. The reservoir 68 may store the washer fluid only for supplying the sensors 54 or also for other purposes, such as supply to a windshield. Alternatively, the reservoir 68 may be disposed in the cavity 64 of the housing 62.

The pump 70 can force the washer fluid through the supply lines 72 and the manifold 74 to the nozzles 80 with sufficient pressure that the washer fluid sprays from the nozzles 80. The pump 70 is fluidly connected to the reservoir 68. The pump 70 may be attached to or disposed in the reservoir 68. The pump 70 is fluidly connected to the manifold 74, specifically to the inlet 36 of the first manifold section 76 of the manifold 74, via one of the supply lines 72.

The supply lines 72 extend from the pump 70 to the manifold 74 (i.e., to the inlet 36 of the first manifold section 76 of the manifold 74) and from the manifold 74 (i.e., the first outlets 50 and second outlets 52 of the second manifold section 78 of the manifold 74) to the nozzles 80. The supply lines 72 may be, e.g., flexible tubes.

As will be described in more detail below, the manifold 74 includes the first manifold section 76 and the second manifold section 78. The first manifold section 76 includes the inlet 36, which receives washer fluid from the pump 70 via the supply lines 72. The second manifold section 78 includes the first outlets 50 and the second outlets 52, which can vary in number. In the example shown in FIGS. 2-5, the second manifold section 78 includes five first outlets 50 and one second outlet 52. In the example shown in FIG. 6, the second manifold section 78 includes three first outlets 50 and two second outlets 52. The manifold 74 can direct washer fluid entering the inlet 36 to any combination of the first outlets 50 and the second outlets 52, i.e., can independently block or open each of the respective first outlets 50 and second outlets 52, by actuating the solenoid valves 44, 46, 48, as described in more detail below. The manifold 74 can be disposed in the cavity 64 of the housing 62 and fixed relative to the housing 62.

Each of the nozzles 80 is fluidly connected to one of the first outlets 50 or second outlets 52 via one of the supply lines 72. The nozzles 80 are positioned to eject the washing fluid to clear obstructions from the fields of view of the sensors 54, e.g., aimed at the sensors 54 or at windows (not labeled) for the sensors 54. For example, the nozzles 80 connected to the first outlets 50 can be aimed at the cameras of the sensors 54, and the nozzles 80 connected to the second outlets 52 can be aimed at the LIDAR device of the sensors 54. The pressure of the washer fluid exiting the nozzles 80 can dislodge or wash away obstructions that may impede the fields of view of the sensors 54.

A controller 110 is communicatively coupled to each of the solenoid valves 44, 46, 48, e.g., via a communications bus. The controller 110 is a microprocessor-based computing device, e.g., an electronic controller or the like, a field-programmable gate array (FPGA), an application-specific integrated circuit (ASIC), etc. The controller 110 can include a processor, a memory, etc. The memory of the controller 110 includes media for storing instructions executable by the processor as well as for electronically storing data and/or databases. The controller 110 can be multiple controllers coupled together.

With reference to FIGS. 3 and 4, the manifold 74 includes the first manifold section 76 and the second manifold section 78. The first manifold section 76 can be formed, e.g., injection-molded, as a single unit. The first manifold section 76 is a single piece, i.e., formed as a continuous unit without internal seams. The second manifold section 78 can be formed, e.g., injection-molded, as a single unit. The second manifold section 78 is a single piece, i.e., formed as a continuous unit without internal seams. The unitary first manifold section 76 and second manifold section 78 helps make manufacturing, assembly, and repair simple.

The second manifold section 78 is fixed relative to the first manifold section 76. The first manifold section 76 includes first bolt plates 82, and the second manifold section 78 includes second bolt plates 84. The first bolt plates 82 and the second bolt plates 84 are flat and parallel to each other. Bolts 86 each extend through one of the first bolt plates 82 and one of the second bolt plates 84. Along with the press-fit of the solenoid valves 44, 46, 48 (described below), the bolts 86 fix the first manifold section 76 and the second manifold section 78 relative to each other.

Figure 5:
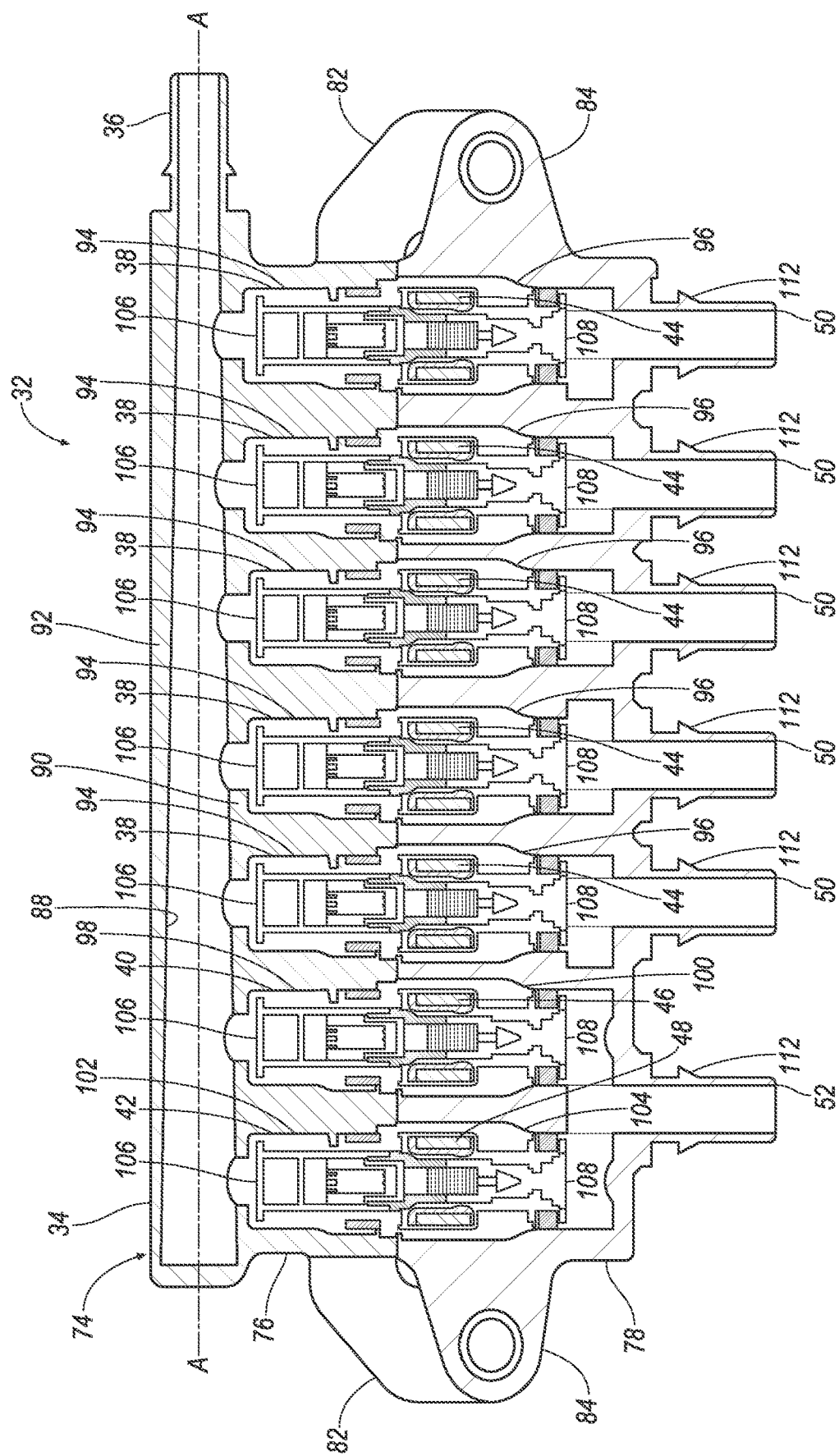
FIG. 5 is a front cross-sectional view of the manifold.
Figure 6:
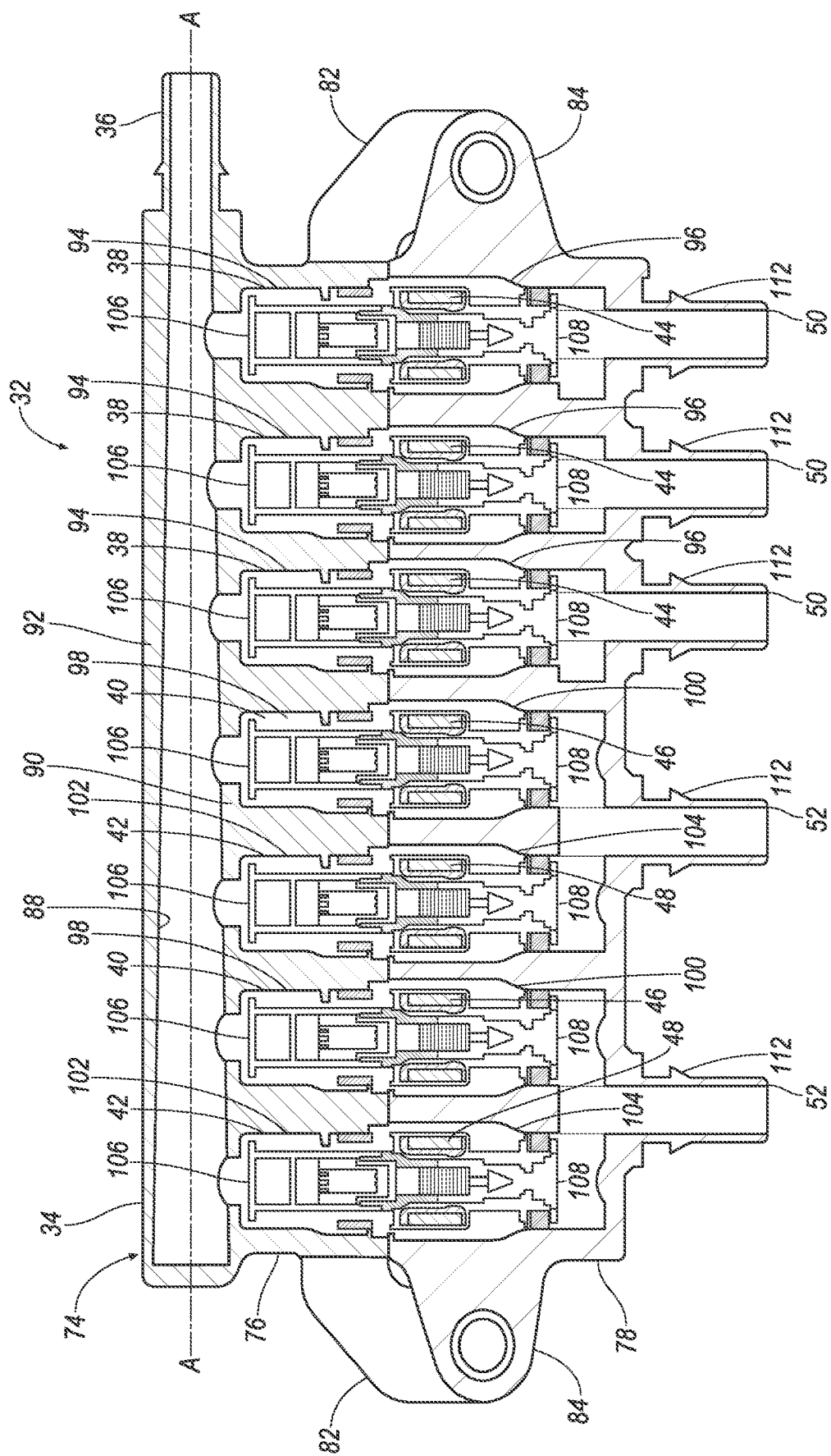
FIG. 6 is a front cross-sectional view of another example of the manifold.

With reference to FIGS. 5 and 6, the first manifold section 76 includes the inlet 36. The inlet 36 is fluidly connected to the pipe 34. The inlet 36 is connected to the pipe 34 at an end of the pipe 34. The inlet 36 is parallel to the axis A, i.e., the inlet 36 is elongated parallel to the axis A, and a direction of flow defined by the inlet 36 is parallel to the axis A. A diameter of the inlet 36 may be less than a smallest diameter of the pipe 34.

The first manifold section 76 includes the pipe 34. The pipe 34 extends straight along the axis A and defines the axis A. The pipe 34 is sealed other than the inlet 36 and the cylindrical tubes 38, 40, 42; i.e., the only routes for fluid to enter or exit the pipe 34 is through the inlet 36 or one of the cylindrical tubes 38, 40, 42. The pipe 34 includes an internal surface 88. The internal surface 88 has a circular cross-section. The internal surface 88 is interrupted by the connections to the cylindrical tubes 38, 40, 42, as described below.

The pipe 34 includes a first longitudinal section 90 and a second longitudinal section 92. The first longitudinal section 90 encompasses a first portion of a cross-section of the pipe 34 that is elongated along the axis A; in other words, the first longitudinal section 90 encompasses a semicircular portion of the pipe 34 around the axis A. The second longitudinal section 92 encompasses a second portion of the cross-section of the pipe 34 opposite the first portion of the cross-section of the pipe 34; in other words, the second longitudinal section 92 encompasses the other semicircular portion of the pipe 34 around the axis A than the first longitudinal section 90. The first and second longitudinal sections 90, 92 completely form the pipe 34 and do not overlap. As shown in FIGS. 5 and 6, the first longitudinal section 90 is a bottom half of the pipe 34, and the second longitudinal section 92 is a top half of the pipe 34.

The pipe 34 has an increasing cross-sectional area from the one of the cylindrical tubes 38, 40, 42 that is closest to the inlet 36 to the one of the cylindrical tubes 38, 40, 42 that is farthest from the inlet 36. The cross-sectional area of the pipe 34 increases continuously, i.e., without interruption by nonincreasing sections, from the one of the cylindrical tubes 38, 40, 42 that is closest to the inlet 36 to the one of the cylindrical tubes 38, 40, 42 that is farthest from the inlet 36. The pipe 34, e.g., the internal surface 88 of the pipe 34, has a circular cross-section defining an internal diameter, and the internal diameter of the pipe 34 increases from the one of the cylindrical tubes 38, 40, 42 that is closest to the inlet 36 to the one of the cylindrical tubes 38, 40, 42 that is farthest from the inlet 36. The internal diameter of the pipe 34 increases continuously, i.e., without interruption by nonincreasing sections, from the one of the cylindrical tubes 38, 40, 42 that is closest to the inlet 36 to the one of the cylindrical tubes 38, 40, 42 that is farthest from the inlet 36. For example, the internal diameter of the pipe 34 can increase at a linear rate with distance from the one of the cylindrical tubes 38, 40, 42 that is closest to the inlet 36. The generally increasing cross-sectional area of the pipe 34 allows the fluid apparatus 32 to provide an even flow rate and pressure through each of the cylindrical tubes 38, 40, 42. The targets for which the cylindrical tubes 38, 40, 42 supply fluid, e.g., the sensors 54, can thus receive a consistent and predictable supply of washer fluid.

The manifold 74 includes at least one first cylindrical tube 38, at least one second cylindrical tube 40, and at least one third cylindrical tube 42. In the example shown in FIG. 5, the manifold 74 includes five first cylindrical tubes 38, one second cylindrical tube 40, and one third cylindrical tube 42. In the example shown in FIG. 6, the manifold 74 includes three first cylindrical tubes 38, two second cylindrical tubes 40, and two third cylindrical tubes 42. The first cylindrical tubes 38 are the cylindrical tubes that are fluidly connected one-to-one to the first outlets 50. The second cylindrical tubes 40 are each one of the cylindrical tubes 40, 42 that are fluidly connected to the second outlets 52, and the third cylindrical tubes 42 are each the other of the cylindrical tubes 40, 42 that are fluidly connected to the second outlets 52. In other words, each first outlet 50 is fluidly connected to one first cylindrical tube 38, and each second outlet 52 is fluidly connected to one second cylindrical tube 40 and to one third cylindrical tube 42.

The cylindrical tubes 38, 40, 42 are each fluidly connected to and elongated from the pipe 34. For example, the cylindrical tubes 38, 40, 42 extend from the first longitudinal section 90 of the pipe 34. The cylindrical tubes 38, 40, 42 extend parallel to each other and transverse to the pipe 34, e.g., perpendicular to the pipe 34 as shown in the Figures. The cylindrical tubes 38, 40, 42 are spaced from each other along the axis A. The cylindrical tubes 38, 40, 42 are arranged in series along the pipe 34. Each of the cylindrical tubes 38, 40, 42 can be equally spaced from the consecutive cylindrical tubes 38, 40, 42. The cylindrical tubes 38, 40, 42 can be elongated straight, and the internal cross-sectional areas of the cylindrical tubes 38, 40, 42 can be substantially equal to each other.

The cylindrical tubes 38, 40, 42 are each divided into two portions, a first-manifold-section portion 94, 98, 102 that is part of the first manifold section 76 and a second-manifold-section portion 96, 100, 104 that is part of the second manifold section 78. Accordingly, each first cylindrical tube 38 includes a first first-manifold-section portion 94 that is part of the first manifold section 76 and a first second-manifold-section portion 96 that is part of the second manifold section 78. Each second cylindrical tube 40 includes a second first-manifold-section portion 98 that is part of the first manifold section 76 and a second second-manifold-section portion 100 that is part of the second manifold section 78. Each third cylindrical tube 42 includes a third first-manifold-section portion 102 that is part of the first manifold section 76 and a third second-manifold-section portion 104 that is part of the second manifold section 78. The first first-manifold-section portion 94, second first-manifold-section portion 98 and third first-manifold-section portion 102 have equal lengths of elongation from the pipe 34, which reduces cost and complexity of manufacturing the first manifold section 76.

The fluid apparatus 32 includes as many solenoid valves 44, 46, 48 as cylindrical tubes 38, 40, 42. Each first solenoid valve 44 is positioned to control flow through one of the first cylindrical tubes 38, each second solenoid valve 46 is positioned to control flow through one of the second cylindrical tubes 40, and each third solenoid valve 48 is positioned to control flow through one of the third cylindrical tubes 42. Each first solenoid valve 44 is press-fit into the first first-manifold-section portion 94 of one of the first cylindrical tubes 38 and into the respective first second-manifold-section portion 96 of that first cylindrical tube 38. Each second solenoid valve 46 is press-fit into the second first-manifold-section portion 98 of one of the second cylindrical tubes 40 and into the respective second second-manifold-section portion 100 of that second cylindrical tube 40. Each third solenoid valve 48 is press-fit into the third first-manifold-section portion 102 of one of the third cylindrical tubes 42 and into the respective third second-manifold-section portion 104 of that third cylindrical tube 42. The press-fits fix the first manifold section 76 and the second manifold section 78 relative to one another. The press-fitting provides for simple assembly of the manifold 74. Each solenoid valve 44, 46, 48 extends along a direction of elongation of the respective cylindrical tube 38, 40, 42 from a first end 106 inside the respective first-manifold-section portion 94, 98, 102 to a second end 108 inside the respective second-manifold-section portion 96, 100, 104. The solenoid valves 44, 46, 48 are completely contained within the manifold 74, which can provide low noise, vibration, and harshness.

The second manifold section 78 includes at least one first outlet 50 and at least one second outlet 52. In the example shown in FIG. 5, the second manifold section 78 includes five first outlets 50 and one second outlet 52, and in the example shown in FIG. 6, the second manifold section 78 includes three first outlets 50 and two second outlets 52. Each first outlet 50 is fluidly connected only to the respective first solenoid valve 44 via the respective first second-manifold-section portion 96. Each second outlet 52 is fluidly connected only to the respective second solenoid valve 46 and to the respective third solenoid valve 48 via the respective second second-manifold-section portion 100 and the respective third second-manifold-section portion 104. The internal cross-sectional areas of the first outlets 50 and the second outlets 52 are substantially equal to each other. The outlets 50, 52 each include a flange 112 extending radially outward and angled away from a fluid-flow direction and toward the pipe 34. The flange 112 makes connections to the outlets 50, 52 easy to attach and also serves to hold connected supply lines (not shown) on the outlets 50, 52.

Each solenoid valve 44, 46, 48 is actuatable between an open position permitting flow and a closed position blocking flow through the respective one of the cylindrical tubes 38, 40, 42. Each solenoid valve 44, 46, 48 includes a solenoid and a plunger. Electrical current through the solenoid generates a magnetic field, and the plunger moves in response to changes in the magnetic field. Depending on its position, the plunger permits or blocks flow through the respective cylindrical tube 38, 40, 42.

The controller 110 is programmed to instruct the solenoid valves 44, 46, 48 to actuate. The controller 110 is programmed to instruct each first solenoid valve 44 to actuate independently of other first solenoid valves 44, of the second solenoid valves 46, and of the third solenoid valves 48. "A actuating independently of B" means A is actuated regardless of whether or not B is simultaneously actuating. The controller 110 is programmed to instruct each second solenoid valve 46 and third solenoid valve 48 fluidly connected to the same second outlet 52 to actuate only together. The controller 110 is programmed to instruct each second solenoid valve 46 and third solenoid valve 48 to actuate independently of the first solenoid valves 44, of second solenoid valves 46 connected to different second outlets 52, and of third solenoid valves 48 connected to different second outlets 52. The independent actuation permits the fluid apparatus 32 to independently clean different sensors 54, conserving energy and washer fluid by not cleaning all the sensors 54 when only one needs cleaning. Co-dependent actuation of respective second and third solenoid valves 46, 48 simplifies programming and operation while permitting the manifold 74 to consistently provide different pressures for cleaning different sensors 54, e.g., higher pressure for cleaning a LIDAR and lower pressure for cleaning a camera.

The disclosure has been described in an illustrative manner, and it is to be understood that the terminology which has been used is intended to be in the nature of words of description rather than of limitation. The adjectives "first," "second," and "third" are used throughout this document as identifiers and are not intended to signify importance, order, or quantity. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:
1. A fluid apparatus comprising:
a straight pipe;
an inlet fluidly connected to the pipe;

a first cylindrical tube, a second cylindrical tube, and a third cylindrical tube each fluidly connected to and elongated from the pipe;
a first solenoid valve controlling flow through the first cylindrical tube;
a second solenoid valve controlling flow through the second cylindrical tube;
a third solenoid valve controlling flow through the third cylindrical tube;
a first outlet fluidly connected only to the first solenoid valve; and
a second outlet fluidly connected only to the second solenoid valve and the third solenoid valve.

2. The fluid apparatus of claim 1, wherein the first and second outlets each include a flange extending radially outward and angled toward the pipe.

3. The fluid apparatus of claim 1, further comprising a controller communicatively coupled to the first solenoid valve, the second solenoid valve, and the third solenoid valve, wherein the controller is programmed to instruct the second solenoid valve and the third solenoid valve to actuate only together.

4. The fluid apparatus of claim 3, wherein the controller is programmed to instruct the first solenoid valve to actuate independently of the second solenoid valve and third solenoid valve.

5. The fluid apparatus of claim 1, wherein the pipe has a circular cross-section defining an internal diameter.

6. The fluid apparatus of claim 5, wherein the internal diameter of the pipe continuously increases from one of the first cylindrical tube, second cylindrical tube, and third cylindrical tube that is closest to the inlet to another one of the first cylindrical tube, second cylindrical tube, and third cylindrical tube that is farthest from the inlet.

7. The fluid apparatus of claim 1, further comprising a manifold including a first manifold section, wherein the first manifold section includes the straight pipe, the inlet, at least a portion of the first cylindrical tube, at least a portion of the second cylindrical tube, and at least a portion of the third cylindrical tube.

8. The fluid apparatus of claim 7, wherein the first manifold section is a single piece.

9. The fluid apparatus of claim 7, wherein the manifold includes a second manifold section, and the second manifold section includes the first outlet and the second outlet.

10. The fluid apparatus of claim 9, wherein the second manifold section is a single piece.

11. The fluid apparatus of claim 9, wherein
the first cylindrical tube includes a first first-manifold-section portion that is part of the first manifold section and a first second-manifold-section portion that is part of the second manifold section;
the second cylindrical tube includes a second first-manifold-section portion that is part of the first manifold section and a second second-manifold-section portion that is part of the second manifold section;
the third cylindrical tube includes a third first-manifold-section portion that is part of the first manifold section and a third second-manifold-section portion that is part of the second manifold section;
the first solenoid valve is press-fit into the first first-manifold-section portion and into the first second-manifold-section portion;
the second solenoid valve is press-fit into the second first-manifold-section portion and into the second second-manifold-section portion; and
the third solenoid valve is press-fit into the third first-manifold-section portion and into the third second-manifold-section portion.

12. The fluid apparatus of claim 1, wherein the first cylindrical tube, the second cylindrical tube, and the third cylindrical tube are elongated perpendicular to the pipe.

13. The fluid apparatus of claim 1, wherein the first cylindrical tube, the second cylindrical tube, and the third cylindrical tube are arranged in series along the pipe.

14. The fluid apparatus of claim 1, wherein the first cylindrical tube, the second cylindrical tube, and the third cylindrical tube are elongated parallel to each other from the pipe.

15. The fluid apparatus of claim 1, wherein internal cross-sectional areas of the first cylindrical tube, the second cylindrical tube, and the third cylindrical tube are substantially equal to each other.

16. The fluid apparatus of claim 1, wherein internal cross-sectional areas of the first outlet and the second outlet are substantially equal to each other.

17. The fluid apparatus of claim 1, further comprising a pump fluidly connected to the inlet.

18. The fluid apparatus of claim 9, wherein
the first cylindrical tube includes a first first-manifold-section portion that is part of the first manifold section and a first second-manifold-section portion that is part of the second manifold section, the first first-manifold-section portion abutting the first second-manifold-section portion;
the second cylindrical tube includes a second first-manifold-section portion that is part of the first manifold section and a second second-manifold-section portion that is part of the second manifold section, the second first-manifold-section portion abutting the second second-manifold-section portion; and
the third cylindrical tube includes a third first-manifold-section portion that is part of the first manifold section and a third second-manifold-section portion that is part of the second manifold section, the third first-manifold-section portion abutting the third second-manifold-section portion.

* * * * *